(12) United States Patent
Park et al.

(10) Patent No.: US 9,661,189 B2
(45) Date of Patent: *May 23, 2017

(54) METHOD AND APPARATUS FOR ADAPTIVE RATE-BASED IMAGE DATA TRANSMISSION AND RECEPTION

(75) Inventors: Sung-bum Park, Seongnam-si (KR); Hyuk-choon Kwon, Seoul (KR); Huai-Rong Shao, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/122,543

(22) PCT Filed: May 29, 2012

(86) PCT No.: PCT/KR2012/004224
§ 371 (c)(1),
(2), (4) Date: Nov. 26, 2013

(87) PCT Pub. No.: WO2012/161556
PCT Pub. Date: Nov. 29, 2012

(65) Prior Publication Data
US 2014/0119648 A1    May 1, 2014

Related U.S. Application Data

(60) Provisional application No. 61/490,177, filed on May 26, 2011.

(51) Int. Cl.
*G06K 9/36*    (2006.01)
*H04N 1/64*    (2006.01)
(Continued)

(52) U.S. Cl.
CPC ......... *H04N 1/646* (2013.01); *H04L 47/2416* (2013.01); *H04L 47/32* (2013.01);
(Continued)

(58) Field of Classification Search
None
See application file for complete search history.

(56) References Cited

U.S. PATENT DOCUMENTS 7,650,603 B2    1/2010    Green
8,311,120 B2    11/2012   Kaushik
(Continued)

FOREIGN PATENT DOCUMENTS

JP    11-355776 A      12/1999
JP    2002-44673 A      2/2002
(Continued)

OTHER PUBLICATIONS

Deshpande et al., "Scalable Streaming of JPEG2000 Images using Hypertext Transfer Protocol", Proc. ACM Conf. on Multimedia, pp. 372-381, Oct. 2-4, 2001.*

(Continued)

*Primary Examiner* — Feng Niu
(74) *Attorney, Agent, or Firm* — Sughrue Mion, PLLC

(57) ABSTRACT

A method of transmitting data, including obtaining luma element values and chroma element values of respective pixels included in a pixel block having a predetermined size; obtaining a plurality of partitions in which the luma element values and the chroma element values are based on a spatial position of the pixels in the pixel block; and selectively transmitting the plurality of partitions according to a data rate of the image data.

24 Claims, 9 Drawing Sheets

(51) Int. Cl.
*H04N 21/4363* (2011.01)
*H04L 12/853* (2013.01)
*H04L 12/823* (2013.01)
*H04N 21/4402* (2011.01)
*H04N 21/63* (2011.01)

(52) U.S. Cl.
CPC ........ *H04N 21/43637* (2013.01); *H04N 21/440263* (2013.01); *H04N 21/43635* (2013.01); *H04N 21/631* (2013.01)

(56) References Cited

U.S. PATENT DOCUMENTS

| | | | | |
|---|---|---|---|---|
| 8,605,797 | B2* | 12/2013 | Shao | H04N 19/89 375/240.24 |
| 8,891,610 | B2* | 11/2014 | Ngo et al. | 375/240.01 |
| 2005/0105807 | A1 | 5/2005 | Suino et al. | |
| 2007/0202842 | A1* | 8/2007 | Shao | H04N 19/89 455/403 |
| 2010/0265392 | A1 | 10/2010 | Shao et al. | |

FOREIGN PATENT DOCUMENTS

| | | |
|---|---|---|
| JP | 2005-94578 A | 4/2005 |
| JP | 2008-219479 A | 9/2008 |
| JP | 2010-515305 A | 5/2010 |
| KR | 10-2002-0054236 A | 7/2002 |
| KR | 10-2008-0031259 A | 4/2008 |
| KR | 10-2008-0095833 A | 10/2008 |
| KR | 10-0919886 B1 | 9/2009 |
| KR | 10-2010-0095914 A | 9/2010 |
| WO | 2008072848 A1 | 6/2008 |

OTHER PUBLICATIONS

International Search Report (PCT/ISA/210), dated Dec. 17, 2012, issued by the International Searching Authority in counterpart International Patent Application No. PCT/KR2012/004224.
Written Opinion (PCT/ISA/237), dated Dec. 17, 2012, issued by the International Searching Authority in counterpart International Patent Application No. PCT/KR2012/004224.
Communication, Issued by the European Patent Office, Dated Nov. 13, 2014, In counterpart European Application No. 12790263.3.
Shao et al., "Progressive Transmission of Uncompressed Video over mmW Wireless", 2010 7th IEEE Consumer Communications and Networking Conference, Jan. 2010, 5 pages, URL: http://ieeexplore.ieee.org/xpls/abs_all.jsp?arnumber=5421614.
Communication, Issued by the Japan Patent Office, Dated Jan. 20, 2015, In counterpart Japanese Application No. 2014-512773.
Communication dated Apr. 1, 2014 issued by the Korean Intellectual Property Office in counterpart Korean Patent Application No. 10-2012-0056978.

\* cited by examiner

METHOD AND APPARATUS FOR ADAPTIVE RATE-BASED IMAGE DATA TRANSMISSION AND RECEPTION

CROSS-REFERENCE TO RELATED PATENT APPLICATION

This application is a national stage entry under 35 U.S.C. §371(c) of International Patent Application No. PCT/KR2012/004224, filed May 29, 2012, and claims priority from U.S. Provisional Patent Application No. 61/490,177, filed on May 26, 2011, in the U.S. Patent and Trademark Office, the disclosures of which is incorporated herein in their entirety by reference.

BACKGROUND

1. Field

Apparatuses and methods consistent with exemplary embodiments relate to electronic communication, and more particularly, to communication for transmission of image data.

2. Description of the Related Art

Due to an increase in resolution of images, the number of electronic devices that are capable of displaying high-definition (HD) images has increased. Most conventional devices compress HD images having a bandwidth of several Gbps into smaller images so as to perform data transmission between devices. However, when an image is compressed or restored, a portion of image information may be lost or quality of the image may deteriorate.

In a wireless communication system, connection setting and channel bandwidth allocation are performed before an image stream is transmitted. Here, the image stream may be transmitted after a sufficient channel bandwidth is allocated, and control with respect to stream configuration is completed. However, due to another transmission that is ongoing in the same channel, sufficient channel bandwidth may not be ensured. Also, quality of a wireless channel is dynamically changed according to time. In particular, in a 60 GHz band wireless channel in which beamformed transmission is performed, a channel may be even affected by a person's motion.

SUMMARY

One or more exemplary embodiments may provide a method and apparatus for decreasing a data rate during transmission of image data by performing pixel dropping on pixel blocks that form uncompressed image data, based on a reference distance between pixels.

One or more exemplary embodiments may also provide a method and apparatus for receiving the uncompressed image data having had the pixel dropping performed thereon, and for restoring dropped pixels of each pixel block. One or more exemplary embodiments may also provide a computer-readable recording medium having recorded thereon a program for executing the methods on a computer.

According to an aspect of an exemplary embodiment, there is provided a method of transmitting image data in a wireless manner, the method including obtaining luma element values and chroma element values of each of pixels included in a pixel block having a predetermined size; obtaining a plurality of partitions in which the luma element values and the chroma element values are arranged based on a spatial position of the pixels in the pixel block; and selectively transmitting the plurality of partitions according to a data rate of the image data.

The method may further include dropping at least one partition in order to reduce the data rate of the image data, wherein the selective transmitting may include transmitting the plurality of partitions other than dropped partitions.

The dropping may include dropping the at least one partition while progressively increasing the number of dropped partitions based on a bandwidth of a wireless channel for transmitting the image data.

The dropping may include dropping the at least one partition starting from a partition of an importance level of a lowest order, based on importance levels of the plurality of partitions.

The obtaining of the plurality of partitions may include separating luma element values and chroma element values from each other and respectively positioning the luma element values and the chroma element values in different partitions.

The pixel block may include four pixels in which two pixel lines and two pixel columns are disposed.

A color format of the image data may be any one of YCbCr 4:4:4, YCbCr 4:2:2, and YCbCr 4:2:0.

The number of the plurality of partitions may be determined based on the color format of the image data.

According to an aspect of another exemplary embodiment, there is provided a method of receiving image data in a wireless manner, the method including receiving the image data in which at least one of a luma element value and a chroma element value of some pixels is dropped; and restoring the dropped luma element value and chroma element value with reference to a data value included in the received image data.

In the received image data, at least one of a plurality of partitions in which luma element values and chroma element values included in a pixel block, which are separate from each other are positioned, may be dropped.

The receiving may include receiving the image data together with indexing information about a color format of the image data and the dropped partition, and the restoring may include restoring the dropped luma element value and chroma element value, based on the indexing information.

According to an aspect of another exemplary embodiment, there is provided a wireless transmitter for transmitting image data in a wireless manner, the wireless transmitter including a pixel partitioning module for obtaining luma element values and chroma element values of each of pixels included in a pixel block having a predetermined size, and for obtaining a plurality of partitions in which the luma element values and the chroma element values are arranged based on a spatial position of the pixels in the pixel block; and a data transmitting module for selectively transmitting the plurality of partitions according to a data rate of the image data.

According to an aspect of another exemplary embodiment, there is provided wireless receiver for receiving image data, the wireless receiver including a data receiving module for receiving the image data in which at least one of a luma element value and a chroma element value of some pixels is dropped; and a data restoring module for restoring the dropped luma element value and chroma element value with reference to a data value included in the received image data.

According to an aspect of another exemplary embodiment, there is provided a computer readable recording medium having recorded thereon a program for executing the method.

BRIEF DESCRIPTION OF THE DRAWINGS

The above and other exemplary features and advantages will become more apparent from the following description of exemplary embodiments with reference to the attached drawings in which.

DETAILED DESCRIPTION

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description. Thus, the terms used herein are defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software. Expressions such as "at least one of," when preceding a list of elements, modify the entire list of elements and do not modify the individual elements of the list.

Hereinafter, image data that is transmitted and received through a wireless channel includes a plurality of pixels indicating image information. According to Wireless Gigabit Alliance (WiGig) standards, a format of uncompressed image data whose data rate, i.e., the data rate at which the uncompressed image data is transmitted, is dynamically adjusted based on an available bandwidth of a wireless channel is called a 'WiGig Spatial Processing (WSP) format'. Information indicating whether a format of uncompressed image data is the WSP format may be included in a FeatureList field of a transmitted packet. The WSP format may be applied to both two-dimensional (2D) image data and three-dimensional (3D) image data.

Hereinafter, exemplary embodiments will be described with reference to the attached drawings.

Figure 1:
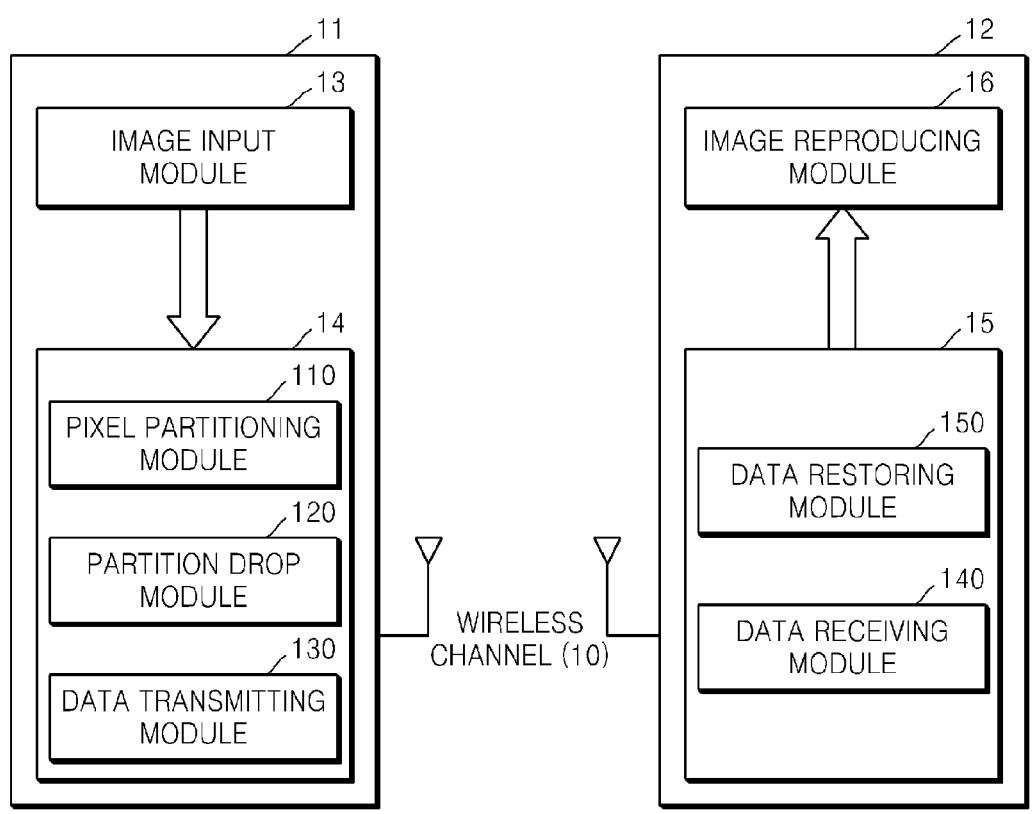
FIG. 1 is a block diagram of a wireless communication system for transmitting image data from a wireless transmitter to a wireless receiver via a wireless channel 10, according to an exemplary embodiment.

FIG. 1 is a block diagram of a wireless communication system for transmitting image data from a wireless transmitter 11 to a wireless receiver 12 via a wireless channel 10, according to an exemplary embodiment. A format of the transmitted image data may be a WSP format or a format determined according to a standard other than WiGig. Although in the present embodiment the transmitter 11 and the receiver 12 communicate via a wireless channel 10, other embodiments may include a communication system with a transmitter and a receiver connected via a wired channel (not shown).

An image input module 13 in the wireless transmitter 11 may provide data including uncompressed image data to a transmitting unit 14 via various types of wired or wireless interfaces. For example, the image input module 13 may be an image decoder or an uncompressed high-definition (HD) image recording unit.

The transmitting unit 14 may use a millimeter wave (mmWave) wireless technology so as to transmit the image data to a receiving unit 15 in the wireless receiver 12. Other wireless technology such as an ultra wide band (UWB) or 802.11n may be used for an image format such as 480p.

The receiving unit 15 of the wireless receiver 12 may provide the received information to an image reproducing module 16 via another wired or wireless module. The image reproducing module 16 may be, for example, a high-definition television (HDTV), a monitor, a projector, or the like.

A pixel partitioning module 110, i.e. a pixel partitioner, included in the wireless transmitter 11 may position a luma element value and a color component value of pixels in a plurality of partitions in order to transmit image data. A process of obtaining a plurality of partitions in which a luma element value and a color component value of pixels are positioned may be referred to as a pixel partitioning process.

A plurality of pixels included in image data may each include at least one of a brightness (Luma) component indicating brightness and a chrominance (Chroma) component indicating chroma. With regard to image data having a YCbCr color format, a luma element may be denoted by 'Y' and a chroma element may be denoted by 'Cb' and 'Cr'. According to another exemplary embodiment, in addition to a YCbCr color format, image data having a YCoCg color format may be considered. With regard to image data having a YCoCg color format, a chroma element may be denoted by 'Co' and 'Cg'. Although YCbCr and YCoCg color formats are described in the present embodiment, other color formats may be used and embodiments are not limited thereto.

Information about a color format of image data may be included in a ComponentConfiguration field of a packet to be transmitted. The ComponentConfiguration field may include 0b01 in the case of the YCbCr color format and may include 0b10 in the case of the YCoCg color format.

The pixel partitioning module 110 obtains luma element values and chroma element values, which are included in respective pixels, and positions the luma element values and the chroma element values in a plurality of different partitions. A method of positioning luma element values and chroma element values, which are included in a pixel block, in a plurality of partitions will be described with reference to FIGS. 6 through 8.

A partition drop module 120, i.e. a partition selector, may drop data of at least one partition selected from data about a plurality of partitions included in image data in order to adjust a data rate of the image data. When the data rate of the image data to be transmitted is not sufficiently low with respect to an environment or a bandwidth of the wireless channel 10, the partition drop module 120 included in the transmitting unit 14 may decrease the data rate by progressively dropping a partition.

The wireless transmitter 11 may further include a data transmitting module 130, i.e. a data transmitter, for transmitting the image data whose data rate is adjusted to the wireless receiver 12 via the wireless channel 10.

In order to correspond to the wireless transmitter 11, the receiving unit 15 included in the wireless receiver 12 may include a data receiving module 140, i.e. a data receiver, for wireless communication, and a data restoring module 150, i.e. a data restorer, for regressively performing operations of the partition drop module 120 so as to restore the image data before its data rate is adjusted.

Figure 2:
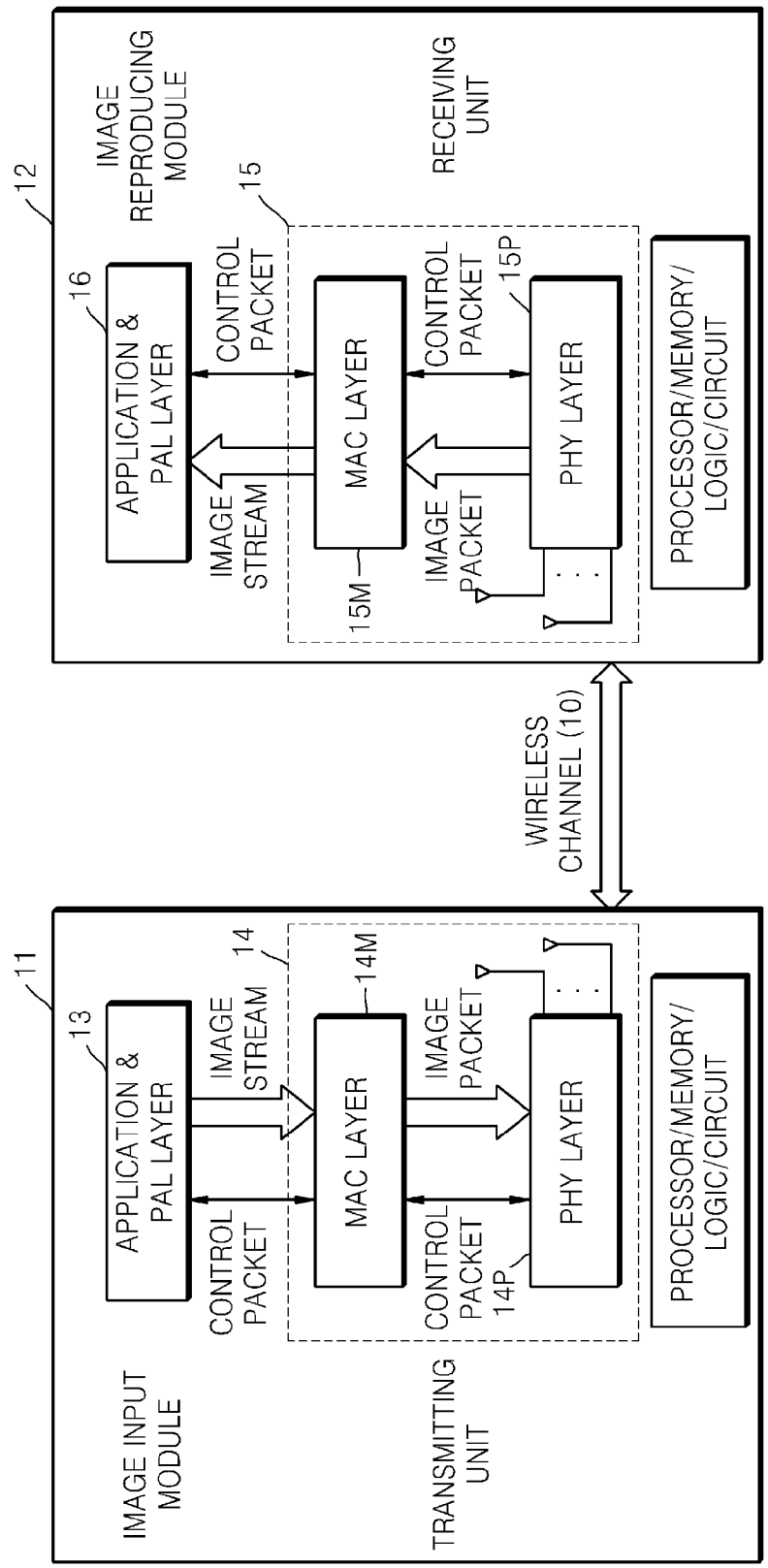
FIG. 2 is a block diagram of the wireless communication system shown in FIG. 1, according to another exemplary embodiment.

FIG. 2 illustrates an example of adjusting a data rate and transmitting image data in a wireless communication system including a wireless channel 10, according to an exemplary embodiment. Although in the present embodiment a wireless transmitter 11 and a wireless receiver 12 communicate via the wireless channel 10, other embodiments may include a communication system with a transmitter and a receiver connected via a wired channel (not shown).

An image input module 13 of a wireless transmitter 11 may include an application & protocol adaptation layer (PAL) layer that continuously streams an image stream to a media access control (MAC) layer 14M in a transmitting unit 14. The MAC layer 14M may packetize the image stream into MAC packets and may transmit the MAC packets to a physical (PHY) layer 14P so as to transmit the image stream to a wireless receiver 12 via the wireless channel 10.

In the wireless receiver 12, a PHY layer 15P in a receiving unit 15 may receive the MAC packets and may provide the MAC packets to a MAC layer 15M. The MAC layer 15M may depacketize the MAC packets and may provide image information to an image reproducing module 16. The image reproducing module 16 may include an application & PAL layer.

According to the present embodiment, the MAC layer 14M of the wireless transmitter 11 generates image packets from the image stream that is provided by the image input module 13, based on a size and a shape of a pixel block for pixel partitioning. The pixel block denoted as N×M may indicate a group of adjacent image pixels having N pixel lines and M pixel columns.

Figure 3:
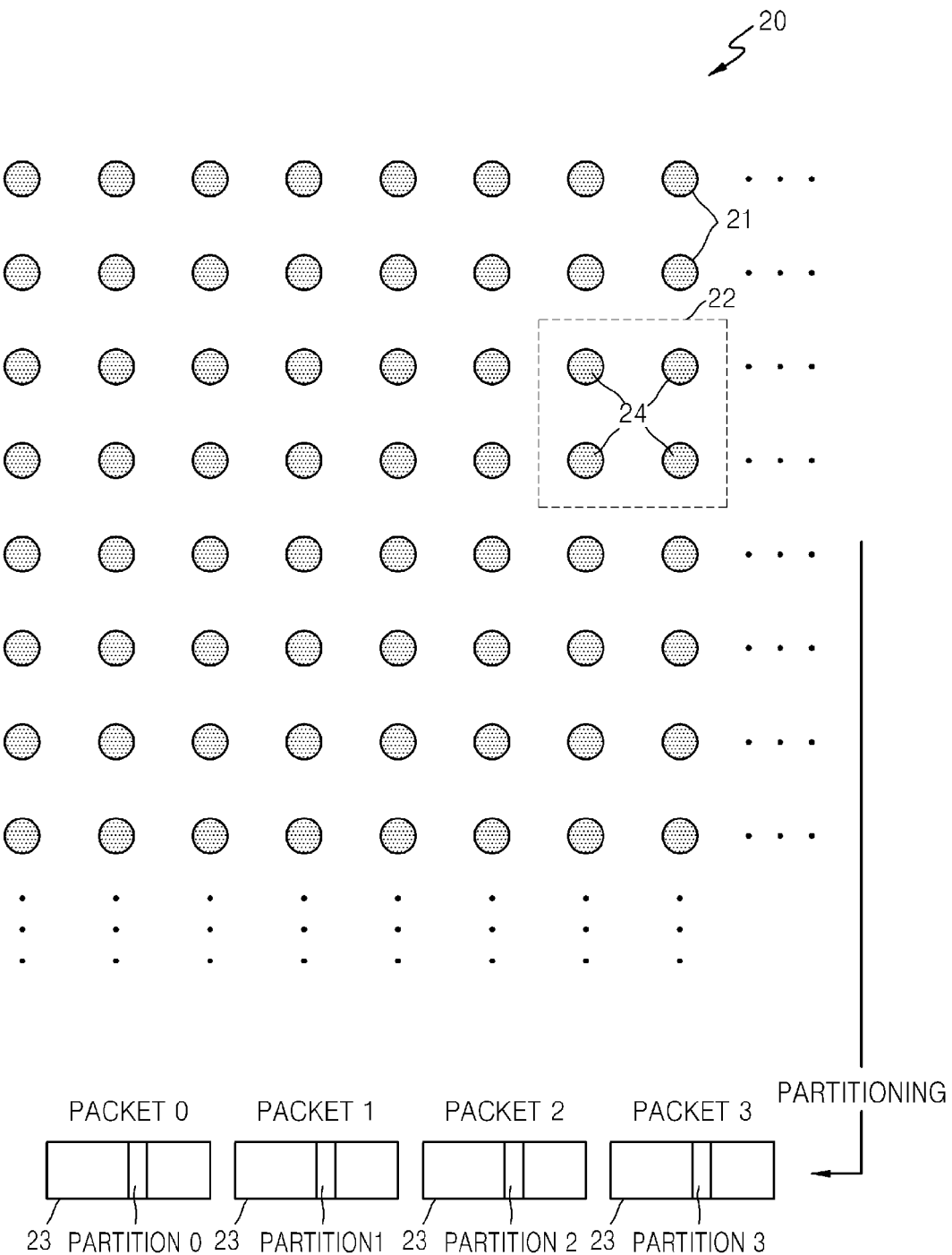
FIG. 3 illustrates a 2D uncompressed image frame of a plurality of pixels, according to an exemplary embodiment.

FIG. 3 illustrates a 2D uncompressed image frame 20 of a plurality of pixels 21, according to an exemplary embodiment. The plurality of pixels 21 are expressed by using a symbol 'O'.

In the present embodiment, a pixel block 22 that is 2×2 is used to map the plurality of pixels 21 to four pixel partitions 23 (that is, a partition 0, a partition 1, a partition 2, and a partition 3). The pixel partitions 23 are inserted into packets in the MAC layer 14M of the transmitting unit 14, and the packets pass through the PHY layer 14P and then are transmitted to the wireless receiver 12 via the wireless channel 10. The packets that are received by the PHY layer 15P of the receiving unit 15 may be depacketized in the MAC layer 15M.

A size of the pixel block 22 may be determined according to a capacity of a memory buffer of the wireless receiver 12, a format of image data, and a type of content. For example, if image data of 2 rows may be buffered due to a limit of a buffer capacity in a chip, a maximum pixel block size may be 2×M (M=1, 2, 3, . . . ). For example, the pixel block may have four pixels 24 and has a size of 2×2.

The type of content, and a resolution and a format of an image may also affect the size of the pixel block 22. According to the present embodiment, information about the size of the pixel block 22 may be stored in a BlockMode field in the image data that is transmitted via the wireless channel 10.

In general, pixels in pixel blocks occupying a small portion in an entire region are likely to have relatively similar values. In addition, the size of a pixel block for processing pixels having similar values may be proportionate to a resolution of an image. In an HD image of 1920× 1080, pixels in an 8×8 pixel block generally have highly similar values. However, in an image having a low resolution of 800×600, pixels in a 4×4 pixel block generally have similar values, and an 8×8 pixel block may be too large to be a pixel block size. The pixels in the same pixel block may be spatially related to each other.

A size of a pixel block may be determined according to a capacity of a memory buffer of the wireless receiver 12, a format of image data, and a type of content. According to the present embodiment, in the case of a pixel block having a size of 2×2, the pixel block may include four pixels in which 2 pixel columns and 2 pixel lines are disposed.

Information about the size of a pixel block may be included in a BlockMode field of image data that is transmitted via a wireless channel. That is, with regard to a pixel block having a size of 2×2, a BlockMode field of image data may include indexing information of '2'. Alternatively, the size of a pixel block may be previously set based on a resolution of image data. In this case, information about the size of a pixel block may not be transmitted, but instead may be determined based on a resolution or the like by a receiver and a transmitter.

According to the present embodiment, if a bandwidth that is actually applied to the wireless channel 10 may accept a rate that is requested for an image stream transmitted from the image input module 13, data values of all partitions obtained via a pixel partitioning process are transmitted. However, if the bandwidth of the wireless channel 10 may not be capable of accepting the requested data rate, progressive rate adaptation is performed to decrease the data rate.

Figure 4:
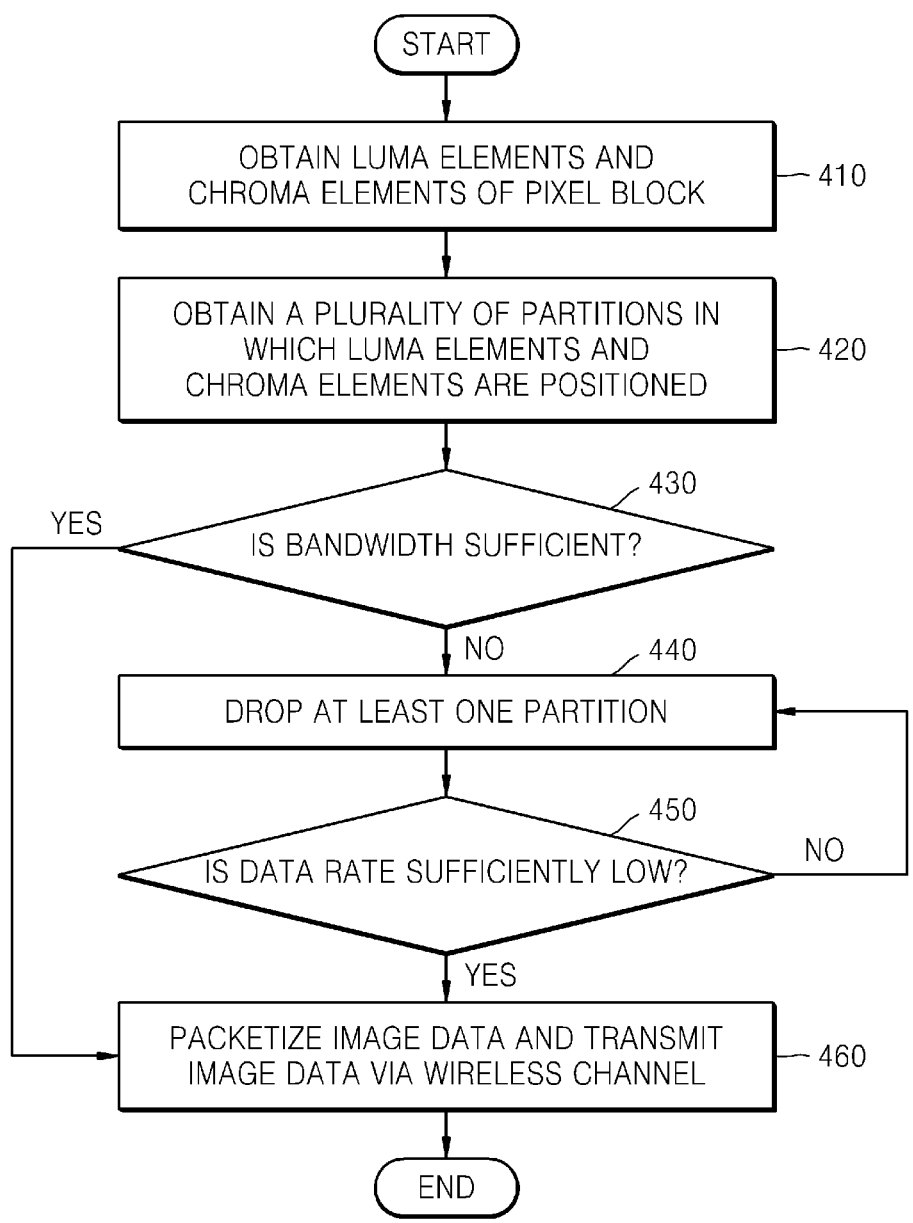
FIG. 4 is a flowchart of a method of controlling a data rate in a wireless transmitter, according to an exemplary embodiment.

FIG. 4 is a flowchart of a method of controlling a data rate in the wireless transmitter 11 (see FIG. 1), according to an exemplary embodiment. The method shown in FIG. 4 may include time-series operations performed by the wireless transmitter 11, the image input module 13, the transmitting unit 14, the pixel partitioning module 110, the partition drop module 120, and the data transmitting module 130 shown in FIGS. 1 and 2.

Figure 5:
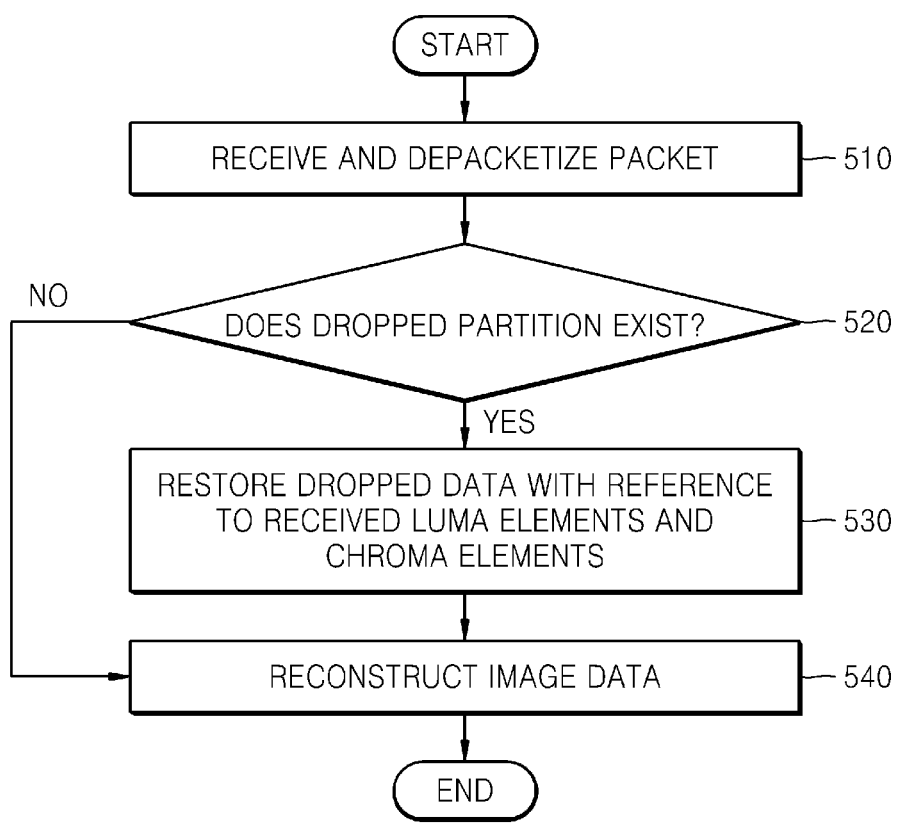
FIG. 5 is a flowchart of a method of restoring image data received by a wireless receiver, according to an exemplary embodiment.

FIG. 5 is a flowchart of a method of restoring image data received by the wireless receiver 12 (see FIG. 1), according to an exemplary embodiment. The method shown in FIG. 5 may include time-series operations performed by the wireless receiver 12, the receiving unit 15, the data receiving module 140, the data restoring module 150, and the image reproducing module 16 shown in FIGS. 1 and 2, like in FIG. 4. Thus, hereinafter, although descriptions are omitted, descriptions given above with reference to FIGS. 1 and 2 may also be applied to the flowcharts of FIGS. 4 and 5.

In operation 410 of FIG. 4, the wireless transmitter 11 obtains luma element values and chroma element values of a pixel blocks. That is, the wireless transmitter 11 obtains luma element values and chroma element values with respect to respective pixels included in pixel blocks.

According to the exemplary embodiment, in operation 410, each of pixels included in a pixel block may include at least one of a luma element value and a chroma element according to a color format of image data. In other words, luma element values and the chroma element values of four pixels included in a pixel block having a size of 2×2 may be determined according to a color format of image data.

For example, in the case of image data of a color format YCbCr 4:4:4, a pixel block includes 4 luma element values and 8 chroma element values. That is, each of 4 pixels includes all of a Y value that is a luma element value, and Cb and Cr values that are chroma element values. On the other hand, in the case of image data of a color format YCbCr 4:2:0, a pixel block includes only 4 luma element values and 2 chroma element values. That is, each of the 4 pixels includes a Y value that is a luma element value, which is the same as in the case of a color format 4:4:4, but a chroma element value includes a single Cb value and a Cr value only.

In operation 420, the wireless transmitter 11 obtains a plurality of partitions in which the obtained luma element values and chroma element values are positioned. That is, a pixel partitioning process is performed. During the pixel partitioning process, a luma element value and a chroma element value may be positioned based on spatial positions of each of pixels included in a pixel block.

For example, from among luma element values, luma element values of a first pixel line may be positioned in a first partition, luma element values of a second pixel line may be positioned in a second partition, and four chroma element values may be positioned in four different partitions based on positions of the respective four chroma element values. Likewise, luma element values and chroma element values may be separate from each other and may be positioned in a plurality of different partitions, respectively.

The number of the plurality of partitions may be determined according to a color format of image data, as described in relation to operation 410. For example, 6 partitions may be obtained with respect to a color format YCbCr 4:4:4. A case of another color format will be described with reference to FIGS. 6 through 8.

A plurality of partitions may each include information about an importance level. An importance level may be used to determine a drop order in which partitions are dropped. Importance levels of partitions for each respective color format will be described with reference to FIGS. 6 through 8

In operation 430, whether a bandwidth of a wireless channel is sufficient to transmit image data is determined. When the bandwidth is sufficient to transmit image data, the method proceeds to operation 460. When the bandwidth is not sufficient to transmit image data, the method proceeds to operation 440.

In operation 440, the wireless transmitter 11 drops at least one partition. When the bandwidth of the wireless channel is not sufficient to transmit image data, the wireless transmitter 11 drops at least one partition from among a plurality of partitions in order to decrease a data rate. An order in which partitions are dropped may be determined according to the above-described importance level. That is, partitions may be dropped starting from a partition of an importance level of a lowest order.

In operation 450, the wireless transmitter 11 determines whether a data rate for transmitting image data in which at least one partition is dropped is sufficiently low with respect to a bandwidth. When the data rate is sufficiently low, the method proceeds to operation 460. When the data rate is not sufficiently low, the method proceeds to operation 440. That is, when the data rate is not sufficiently low, a partition dropping process may be progressively performed.

In operation 460, image data on which a pixel partitioning process is performed is packetized and is transmitted to a wireless receiver via a wireless channel. In operation 460, information about a color format of image data, information about a size of a pixel block, and information about dropped partitions may be hierarchically classified, a result thereof may be indexed, and then indexing information may be transmitted together with an image data packet.

In the flowchart of FIG. 4, operations 420 through 440 may be performed in the application & PAL layer 13 or an audio video control (AVC) layer in the wireless transmitter 11. Specific operations such as packetization may also be related to the MAC layer 14M of the wireless transmitter 11.

FIG. 5 is a flowchart of a method of receiving image data and restoring a partition via the wireless receiver 12, according to an exemplary embodiment.

In operation 510, the wireless receiver 12 receives a data packet that is transmitted via a wireless channel. The received data packet is depacketized.

In operation 520, the wireless receiver 12 checks whether partitions that are dropped by the wireless transmitter 11 via a pixel dropping process exists. Here, the indexing information transmitted in operation 460 in FIG. 4 may be obtained and checked. For example, when 'Dropping Index=0' as indexing information is received, it may be confirmed that a color format of image data is YCbCr 4:4:4 and a partition 5 is dropped. In addition, it may also be confirmed that the partition 5 includes Cb11 and Cr11 for chroma elements and Cb10 and Cr10 for chroma elements are referred to in order to restore the dropped data. In operation 520, a process including obtaining indexing information and checking whether dropped partitions exist via the wireless receiver 12 will be described below in more detail.

When at least one dropped partition exists, the method proceeds to operation 530. When at least one dropped partition does not exist, the method proceeds to operation 540.

In operation 530, the wireless receiver 12 restores dropped data with reference to luma element values and chroma element values included in received image data. The restoring process is performed in reverse order of the partition dropping process. In addition, the wireless receiver 12 may restore dropped data, based on information about a color format of image data and information about a dropped partition. That is, the wireless receiver 12 may restore dropped luma element values and chroma element values with reference to indexing information included in image data. Each restoring process based on a color format and a dropped partition will be described in detail with reference to FIGS. 6 through 8.

In operation 540, the wireless receiver 12 reconstructs entire image data by using the received data and restored data. The reconstructed image data may be transmitted to an image reproducing module and may be reproduced.

In the flowchart of FIG. 5, operations 530 and 540 may be performed in the application & PAL layer 16 (or an AVC layer) in the wireless receiver 12. Depacketizing of operation 510 may be performed by a depacketizing module included in a MAC 15M of the wireless receiver 12.

Hereinafter, a pixel partitioning process, a process of dropping a partition according to an importance level, and a process of restoring dropped data for each respective color format will be described in detail with reference to FIGS. 6 through 8.

Figure 6A:
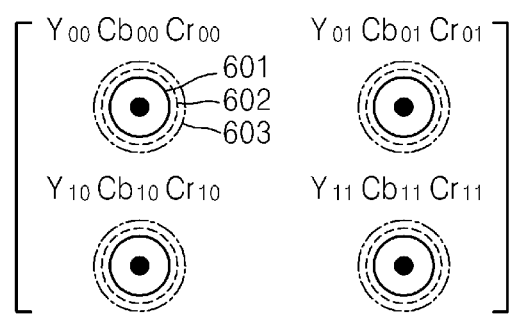
FIGS. 6A through 6B are diagrams for explaining a pixel partitioning process with respect to image data having a color format YCbCr 4:4:4 according to an exemplary embodiment.
Figure 6B:
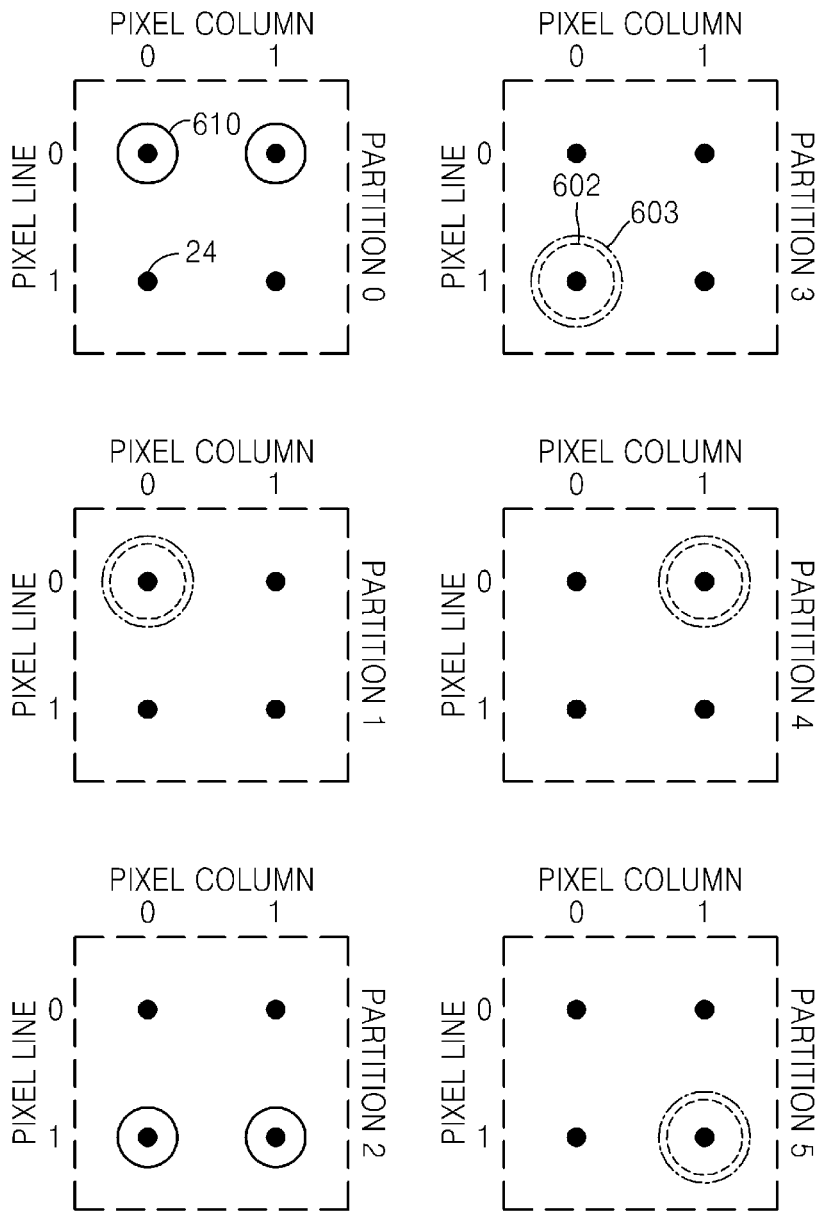

FIGS. 6A through 6B are diagrams for explaining a pixel partitioning process with respect to image data having a color format YCbCr 4:4:4 according to an exemplary embodiment. With regard to the image data having a color format YCbCr 4:4:4, a pixel block having a size of 2×2 includes four pixels in which 2 pixel columns and 2 pixel lines are disposed. The pixel block including the four pixels includes 4 luma element values (Y) and 8 chroma element values (Cb and Cr).

With regard to a color format YCbCr 4:4:4, luma element values and chroma element values are positioned in 6 partitions. The 6 partitions are referred to as a partition 0, a partition 1, a partition 2, a partition 3, a partition 4, and a partition 5, respectively.

In FIG. 6A, each of 4 pixels included in a pixel block includes both a luma element value and a chrominance value. That is, a 'pixel 00' corresponding to a 'pixel line 0' and a 'pixel column 0' includes both a luma element value Y00, and chroma element values Cb00 and Cr00. A pixel 10 corresponding to a pixel line 1 and a pixel column 0 includes both a luma element value Y10, and chroma element values Cb10 and Cr10, like the pixel 00. A pixel 01 and a pixel 11, which correspond to a pixel column 1, may also include both a luma element value and a chroma element value. Hereinafter, a luma element is denoted by a solid line 601 and a chroma element is denoted by a dotted line 602 and a dashed dotted line 603. The same method as the method of denoting a luma element and a chroma element is also applied to FIGS. 7 and 8.

A pixel partitioning process will be described with reference to FIG. 6B. Luma element values of a pixel 00 and a pixel 01, which correspond to a pixel line 0, are positioned in the partition 0. That is, Y00 and Y01 are positioned. A chroma element value of a pixel 00 corresponding to a pixel line 0 and a pixel column 0 is positioned in the partition 1. That is, Cb00 and Cr00 are positioned. Then, Y10 and Y11 are positioned in the partition 2, and Cb10 and Cr10 are positioned in the partition 3. Then, Cb01 and Cr01 are positioned in the partition 4, and Cb11 and Cr11 are positioned in the partition 5. In other words, luma element values and chroma element values of the pixels 24 are separate from each other and are respectively positioned in a plurality of partitions.

With regard to a color format YCbCr 4:4:4, the partition 0 and the partition 1 from among six partitions have the highest importance level. The partition 2 subsequent to the partition 0 and the partition 1 has the second highest importance level and the partition 3 has the third highest importance level. Then, the partition 4 and the partition 5 have the lowest importance level that is a fourth importance level.

Importance levels corresponding to respective partitions may be used in a process of progressively dropping a partition in order to decrease a data rate. For example, when a bandwidth of a wireless is not sufficient to transmit all of the partitions 0 through 5, the wireless transmitter 11 may drop the partitions 4 and 5 having the lowest importance level. When it is required to further decrease a data rate, the partition 3 having the third highest importance level may be dropped and then a partition 2 may be progressively dropped. As a data rate is progressively controlled, the wireless transmitter 11 may transmit image data that selectively includes a plurality of partitions.

When the partitions 4 and 5 are dropped in image data having a color format YCbCr 4:4:4, a data rate of the image data becomes the same as a color format YCbCr 4:2:2. When the partitions 3, 4, and 5 are dropped, a data rate of the image data becomes the same as a color format YCbCr 4:2:0.

A process of restoring data with respect to image data having a color format YCbCr 4:4:4 will now be described. When the partition 5 is dropped, Cb11 and Cr11 that are chroma element values included in the partition 5 may be restored with reference to Cb10 and Cr10 that are chroma element values of a pixel that is spatially adjacent to the dropped chroma element values. That is, the chroma element values included in the dropped partition 5 may be restored with reference to a chroma element value included in a partition having a higher importance level than the partition 5.

Then, when the partitions 4 and 5 are dropped in image data having a color format YCbCr 4:4:4, Cb01 and Cr01 that are chroma element values included in the partition 4 may be restored with reference to Cb00 and Cr00 included in the partition 1. Cb11 and Cr11 included in the partition 5 have already been described above. Then, when the partitions 3, 4, and 5 are dropped, since chroma element values included in the received image data are just Cb00 and Cr00 included in the partition 1, all the dropped chroma element values may be restored with reference to Cb00 and Cr00 of the partition 1.

When the partitions 2, 3, 4, and 5 are drooped, chroma element values are restored with reference to Cb00 and Cr00 included in the partition 1 and Y10 and Y11 that are luma element values are restored with reference to luma element values Y00 and Y01 included in the partition 0.

Figure 7A:
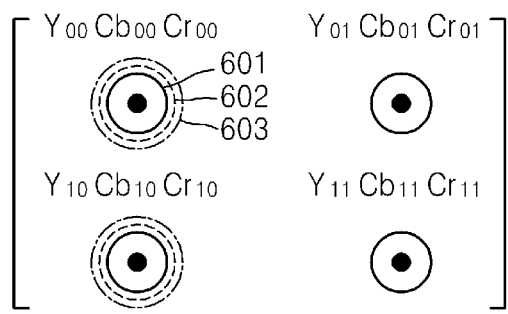
FIGS. 7A through 7B are diagrams for explaining a pixel partitioning process with respect to image data having a color format YCbCr 4:2:2 according to an exemplary embodiment.

FIG. 7A shows a case of image data having a color format YCbCr 4:2:2. In the image data having a color format YCbCr 4:2:2, two pixels, that is, a pixel 00 and a pixel 10, which correspond to a pixel column 0, include both a luma element value and a chroma element value. On the other hand, two pixels, that is, the pixel 01 and the pixel 11, which correspond to a pixel column 1, include only a luma element value. In addition, with regard to a color format YCbCr 4:2:2, luma element values and chroma element values are respectively positioned in four partitions.

Figure 7B:
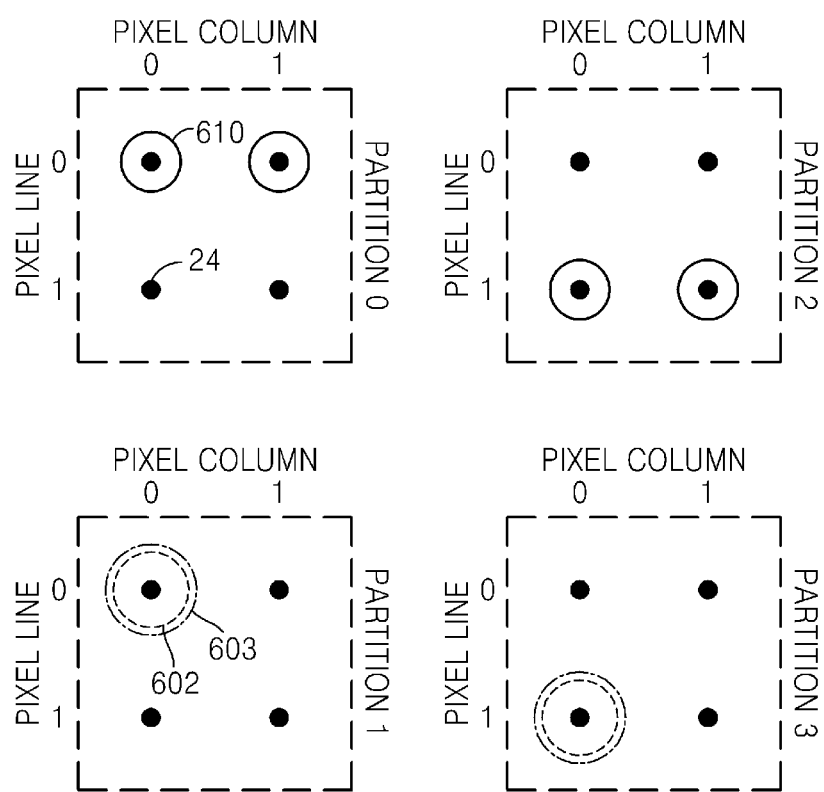

A pixel partitioning process with respect to image data having a color format YCbCr 4:2:2 will now be described with reference to FIG. 7B. A luma element value of a pixel 00 and a pixel 01, which correspond to a pixel line 0, is positioned in a partition 0. That is, Y00 and Y01 are positioned in the partition 0. A chroma element value of a pixel 00, which corresponds to a pixel line 0 and a pixel column 0, is positioned in a partition 1. That is, Cb00 and Cr00 are positioned in the partition 1. Luma element values Y10 and Y11 of a pixel 10 and a pixel 11, which correspond to a pixel line 1, is positioned in a partition 2. Chroma element values Cb10 and Cr10 of a pixel 10 corresponding to a pixel line 1 and a pixel column 0 is positioned in a partition 3.

In a color format YCbCr 4:2:2, the partition 0 and the partition 1 have the first highest importance level and the partition 2 has the second highest importance level. Then, the partition 3 has the lowest importance level. Thus, the partition 3 is first dropped in a partition dropping process. In this case, when a data rate is not sufficient, the partition 2 may be further dropped.

A process of restoring data via a receiver will now be described. When the partition 3 is dropped, a chroma element value included in the partition 3 is restored with reference to the partition 1 that is the only partition including a chroma element value. That is, Cb10 and Cr10 are restored with reference to Cb00 and Cr00, respectively.

When partitions 2 and 3 are dropped, a chroma element value is restored with reference to Cb00 and Cr00 included in the partition 3, and a luma element value is restored with reference to Y00 and Y01 that are luma element values included in the partition 0.

Figure 8A:
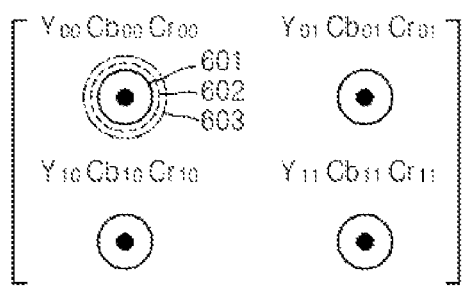
FIGS. 8A through 8B are diagrams for explaining a pixel partitioning process with respect to image data having a color format YCbCr 4:2:0 according to an exemplary embodiment.

FIG. 8A shows a case of image data having a color format YCbCr 4:2:0. With regard to a color format YCbCr 4:2:0, only a pixel 00 corresponding to a pixel line 0 and a pixel column 0 from among four pixels included in a pixel block has both a luma element value and a chroma element value. That is, a pixel 00 includes all Y00, Cb00, and Cr00. The remaining three pixels have only Y01, Y10, and Y11 that are luma element values.

Figure 8B:
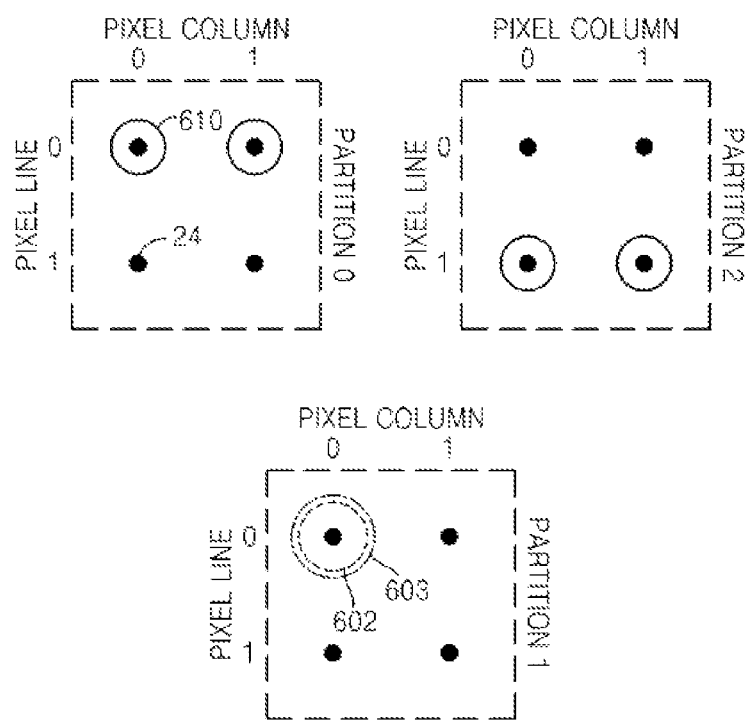

With reference to FIG. 8B, a pixel partitioning process with respect to image data having a color format YCbCr 4:2:0 will now be described. Y00 and Y01 that are luma element values of a pixel 00 and a pixel 01 that are two pixels corresponding to a pixel line 0 are positioned in a partition 0 having the highest importance level. Then, Cb00 and Cr00 that are chroma element values of a pixel 00 are positioned in a partition 1 having the same importance level as the partition 0. Then, Y10 and Y11 that are luma element values of a pixel 10 and a pixel 11 that are two pixels corresponding to a pixel line 1 are positioned in a partition 2 having the second highest importance level. When a partition is dropped in a process of transmitting image data having a color format YCbCr 4:2:0, the partition 2 having the lowest importance level is dropped. Since not all of luma element values and chroma element values of image data are dropped, the partition 0 and the partition 1 having the highest importance level are not dropped.

Next, a process of restoring image data having a color format YCbCr 4:2:0 will be described. When a partition 2 is dropped, Y10 and Y11 that are the dropped luma element values may be restored with reference to Y00 and Y01 of the partition 0 including a luma element value. That is, when Y10 and Y11 are dropped, Y10 and Y11 may be restored with reference to Y00 and Y01 that are luma element values that are spatially adjacent to each other.

According to the one or more embodiments with reference to FIGS. 6 through 8, information about a color format of image data, information about dropped partitions and data values, and information about a data value to be referred to in order to restore data may be hierarchically classified. That is, as shown in FIG. 1, dropped partitions and dropped data values may be classified with respect to respective color formats, and here, information about a data pixel to be referred to in order to restore dropped data values may also be classified.

TABLE 1

| Dropping Index | Chroma Partitioning Mode | Dropped Partition(s) | Dropped Color Component | Reference Color Component |
|---|---|---|---|---|
| 0 | YCbCr 4:4:4 | Part.5 | Cb11 | Cb10 |
|   |   |   | Cr11 | Cr10 |
| 1 |   | Part.4, Part.5 | Cb01 | Cb00 |
|   |   |   | Cr01 | Cr00 |
|   |   |   | Cb11 | Cb10 |
|   |   |   | Cr11 | Cr10 |
| 2 |   | Part.3, Part.4, Part.5 | Cb10 | Cb00 |
|   |   |   | Cr10 | Cr00 |
|   |   |   | Cb01 | Cb00 |
|   |   |   | Cr01 | Cr00 |
|   |   |   | Cb11 | Cb00 |

TABLE 1-continued

| Dropping Index | Chroma Partitioning Mode | Dropped Partition(s) | Dropped Color Component | Reference Color Component |
|---|---|---|---|---|
|   |   |   | Cr11 | Cr00 |
| 3 |   | Part.2, Part.3, Part.4, Part.5 | Y10 | Y00 |
|   |   |   | Y11 | Y01 |
|   |   |   | Cb10 | Cb00 |
|   |   |   | Cr10 | Cr00 |
|   |   |   | Cb01 | Cb00 |
|   |   |   | Cr01 | Cr00 |
|   |   |   | Cb11 | Cb00 |
|   |   |   | Cr11 | Cr00 |
| 4 | YCbCr 4:2:2 | Part.3 | Cb10 | Cb00 |
|   |   |   | Cr10 | Cr00 |
| 5 |   | Part.2, Part.3 | Y10 | Y00 |
|   |   |   | Y11 | Y01 |
|   |   |   | Cb10 | Cb00 |
|   |   |   | Cr10 | Cr00 |
| 6 | YCbCr 4:2:0 | Part.2 | Y10 | Y00 |
|   |   |   | Y11 | Y01 |

As shown in Table 1 above, when a partition 2 including Y10 and Y11 is dropped with respect to image data of a YCbCr 4:4:4 color format, a wireless transmitter may transmit "Dropping Index=3" as indexing information indicating that Y10 and Y11 are the dropped luma element values.

Based on the indexing information, the wireless receiver 12 may recognize that dropped partitions are a partition 2, a partition 3, a partition 4, and a partition 5, and may refer to Y00 and Y01 that are luma element values in order to restore the dropped luma elements.

Table 1 shown above is just an example, and in this regard, 'Dropping Index' that is indexing information that indicates a dropped partition and a color format of data may be variously set according to a combination of a size of the pixel block, a color format of image data, and other additional information.

In the data restoring process according to one or more exemplary embodiments, various methods such as a 0-th order interpolation method, a bilinear interpolation method, a bicubic interpolation method, or the like may be used.

According to the above-described exemplary embodiments, image data may be effectively transmitted without deterioration of image quality. In addition, when uncompressed image data is transmitted, a data rate may be progressively controlled based on an environment or a bandwidth of a wireless channel.

In addition, since a luma element and a chroma element are separate from each other and are transmitted, a data rate may be effectively controlled via unequal error protection (UEP) or the like.

The exemplary embodiments may be written as computer programs and may be implemented in general-use digital computers that execute the programs using a computer-readable recording medium. In addition, a data structure used in the exemplary embodiments may be written in a computer-readable recording medium through various means. Examples of the computer readable recording medium include magnetic storage media (e.g., ROM, floppy disks, hard disks, etc.), and storage media such as optical recording media (e.g., CD-ROMs, or DVDs).

While the exemplary embodiments have been particularly shown and described, it will be understood by those of ordinary skill in the art that various changes in form and details may be made therein without departing from the spirit and scope of the present invention as defined by the following claims.

What is claimed is:

1. A method of transmitting image data in a wireless manner, the method comprising:
    obtaining luma element values and chroma element values of a plurality of pixels included in a pixel block;
    obtaining a plurality of partitions in which the luma element values and the chroma element values are arranged based on a spatial position of the plurality of pixels included in the pixel block; and
    selectively transmitting the plurality of partitions according to a data rate,
    wherein the obtaining the plurality of partitions comprises separating the luma element values from the chroma element values and respectively positioning the separated luma element values and the separated chroma element values in different partitions,
    wherein a partition of the plurality of partitions comprises the separated luma element values of at least two pixels of the plurality of pixels included in the pixel block, and
    wherein the separated luma element values are arranged in different partitions based on a pixel line of the pixel block to which the separated luma element values belong.

2. The method of claim 1, further comprising selecting at least one partition of the plurality of partitions,
    wherein the selectively transmitting comprises transmitting the plurality of partitions other than the at least one selected partition.

3. The method of claim 2, wherein the selecting comprises determining a number of partitions of the at least one partition based on a bandwidth of a wireless channel for transmitting the image data.

4. The method of claim 2, wherein the selecting comprises determining a number of partitions of the at least one partition based on respective importance levels of the plurality of partitions, wherein a partition with a lower importance is selected before a partition of a higher importance.

5. The method of claim 1, wherein the pixel block comprises four pixels in which two pixel lines and two pixel columns are disposed.

6. The method of claim 1, wherein a color format of the image data is any one of YCbCr 4:4:4, YCbCr 4:2:2, and YCbCr 4:2:0.

7. The method of claim 1, wherein a number of the plurality of partitions is determined based on a color format of the image data.

8. A non-transitory computer readable recording medium having recorded thereon a program for executing the method of claim 1.

9. A method of receiving image data in a wireless manner, the method comprising:
    receiving the image data comprising at least one partition of a plurality of partitions, the plurality of partitions comprising luma element values and chroma element values corresponding to a plurality of pixels included in a pixel block, wherein the received image data does not include at least one other partition of the plurality of partitions corresponding to the plurality of pixels included in the pixel block; and
    restoring the at least one other partition of the plurality of partitions with reference to a data value included in the received image data,
    wherein the luma element values and the chroma element values are in different partitions,
    wherein a partition of the plurality of partitions comprises the luma element values of at least two pixels of the plurality of pixels included in the pixel block, and
    wherein separated luma element values are arranged in different partitions based on a pixel line of the pixel block to which the separated luma element values belong.

10. The method of claim 9, wherein the receiving comprises receiving the image data together with separate indexing information about a color format of the image data and the at least one not received partition, and
    wherein the restoring comprises restoring the luma element value and chroma element value of the at least one not received partition based on the indexing information.

11. A transmission apparatus for transmitting image data in a wireless manner, the transmission apparatus comprising:
    at least one processor configured to implement a pixel partitioner configured to obtain luma element values and chroma element values of a plurality of pixels included in a pixel block, and to obtain a plurality of partitions in which the luma element values and the chroma element values are arranged based on a spatial position of the plurality of pixels included in the pixel block; and
    a wireless transmitter configured to selectively transmit the plurality of partitions according to a data rate,
    wherein the pixel partitioner is further configured to separate the luma element values and the chroma element values from each other and to position the separated luma element values and the separated chroma element values in different partitions,
    wherein a partition of the plurality of partitions comprises the separated luma element values of at least two pixels of the plurality of pixels included in the pixel block, and
    wherein the separated luma element values are arranged in different partitions based on a pixel line of the pixel block to which the separated luma element values belong.

12. The transmission apparatus of claim 11, wherein the at least one processor is further configured to implement a partition selector configured to select at least one partition of the plurality of partitions, and
    wherein the wireless transmitter is further configured to transmit the plurality of partitions other than the at least one selected partition.

13. The transmission apparatus of claim 12, wherein the partition selector is configured to determine a number of the at least one partition based on a bandwidth of a wireless channel for transmitting the image data.

14. The transmission apparatus of claim 12, wherein each partition has a respective importance level, and
    wherein the partition selector is configured to select a partition with a lower importance level before selecting a partition with a higher importance level.

15. The transmission apparatus of claim 11, wherein the pixel block comprises four pixels in which two pixel lines and two pixel columns are disposed.

16. The transmission apparatus of claim 11, wherein a color format of the image data is any one of YCbCr 4:4:4, YCbCr 4:2:2, and YCbCr 4:2:0.

17. The transmission apparatus of claim 11, wherein a number of the plurality of partitions is determined based on a color format of the image data.

18. A reception apparatus for receiving image data, the reception apparatus comprising:

a wireless receiver configured to receive the image data in which at least one partition of a plurality of partitions, the plurality of partitions comprising luma element values and chroma element values corresponding to a plurality of pixels included in a pixel block, is not received; and at least one processor configured to implement a data restorer configured to restore the not received at least one partition with reference to a data value included in the received image data, wherein the luma element values and the chroma element values are in different partitions, wherein a partition of the plurality of partitions comprises the luma element values of at least two pixels of the plurality of pixels included in the pixel block, and wherein the separated luma element values are arranged in different partitions based on a pixel line of the pixel block to which the separated luma element values belong.

19. The reception apparatus of claim 18, wherein the received image data comprises at least one partition among the plurality of partitions corresponding to the plurality of pixels included in the pixel block.

20. The reception apparatus of claim 19, wherein the wireless receiver is further configured to receive the image data together with separate indexing information about a color format of the image data and the not received at least one partition of the plurality of partitions, and wherein the data restorer is further configured to restore the not received at least one partition of the plurality of partitions, based on the indexing information.

21. A transmission apparatus for transmitting image data comprising:

at least one processor configured to implement:

a pixel partitioner configured to obtain a plurality of partitions comprising luma element values and the chroma element values corresponding to a plurality of pixels included in a pixel block; and a partition selector configured to select at least one of the obtained partitions based on a bit rate of a communication channel; and a transmitter configured to transmit the unselected partitions, wherein the pixel partitioner is further configured to separate the luma element values and the chroma element values from each other and to position the separated luma element values and the separated chroma element values in different partitions, wherein a partition of the plurality of partitions comprises the separated luma element values of at least two pixels of the plurality of pixels included in the pixel block, and wherein the separated luma element values are arranged in different partitions based on a pixel line of the pixel block to which the separated luma element values belong.

22. The transmission apparatus of claim 21, wherein the partition selector is further configured to select at least one other partition of the obtained partitions until a data size of the image data is below a threshold.

23. A reception apparatus comprising:

a receiver configured to receive image data, wherein the image data comprises at least one partition of chroma element values and luma element values of a pixel block, wherein at least one other partition of chroma element values and luma element values of the pixel block is not received; and at least one processor configured to implement a data restorer configured to restore the at least one other partition with reference to a data value included in the received image data, wherein the partitions of the pixel blocks comprise respective at least one of luma element values and chroma element values, wherein the luma element values and the chroma element values are in different partitions, wherein a partition of the plurality of partitions comprises the luma element values of at least two pixels of the plurality of pixels included in the pixel block, and wherein separated luma element values are arranged in different partitions based on a pixel line of the pixel block to which the separated luma element values belong.

24. The reception apparatus of claim 23, wherein the data restorer is configured to restore the at least one other partition based on a color format of the image data.

* * * * *